United States Patent [19]
Rubin

[11] Patent Number: 5,576,898
[45] Date of Patent: Nov. 19, 1996

[54] OPTICAL SYSTEM FOR VIEWING THE REAR SEAT OF A VEHICLE

[76] Inventor: Sheri J. Rubin, 16161 Ventura Blvd., Suite 613, Encino, Calif. 91436

[21] Appl. No.: 499,735

[22] Filed: Jul. 7, 1995

[51] Int. Cl.$^6$ .............. G02B 5/08; G02B 7/182; B60R 1/04
[52] U.S. Cl. .......... 359/841; 359/857; 359/862; 359/865; 359/872; 362/136; 362/140; 362/142; 296/97.2; 296/97.8; 296/97.11; 296/97.12
[58] Field of Search .................. 359/841, 844, 359/857, 862, 865, 872; 362/135, 136, 140, 142, 144; 296/97.2, 97.5, 97.8, 97.11, 97.12

[56] References Cited

U.S. PATENT DOCUMENTS

| | | |
|---|---|---|
| 1,905,323 | 5/1933 | Wallace . |
| 1,986,033 | 1/1935 | Trufant ............................ 359/857 |
| 2,374,956 | 5/1945 | Rubissow ......................... 359/857 |
| 3,485,555 | 12/1969 | Morris . |
| 3,926,470 | 12/1975 | Marcus ............................ 359/844 |
| 3,970,374 | 7/1976 | Copp . |
| 4,624,539 | 11/1986 | King et al. . |
| 4,687,305 | 8/1987 | Harris, Jr. et al. . |
| 4,702,572 | 10/1987 | Cossey ............................ 359/876 |
| 4,712,892 | 12/1987 | Masucci . |
| 4,733,956 | 3/1988 | Erickson . |
| 4,900,140 | 2/1990 | Okamura . |
| 4,902,118 | 2/1990 | Harris ............................. 359/871 |
| 4,909,618 | 3/1990 | Gardner . |
| 4,934,802 | 6/1990 | Fluharty et al. . |
| 4,948,085 | 8/1990 | Mittelhäuser . |
| 4,961,608 | 10/1990 | Nash .............................. 359/872 |
| 5,285,321 | 2/1994 | Nolan-Brown .................... 359/857 |
| 5,453,882 | 9/1995 | Westman ......................... 359/872 |

*Primary Examiner*—Ricky D. Shafer
*Attorney, Agent, or Firm*—Merchant, Gould, Smith, Edell, Welter & Schmidt

[57] ABSTRACT

An optical system for viewing the rear seat area of a vehicle through a rearview mirror and a roof mounted forward facing mirror is provided. The forward facing mirror is mounted with the headliner in a fixed or adjustable manner and there is a friction hinge for moving the mirror from a substantially flush position with the headliner to an extended position projecting from the headliner. Lights can be provided with the mirror to enhance the image of the rear seat. The mirror system in the rear of the vehicle can be multi-purpose. It can act as a forward facing mirror, alternatively it can swivel to act as a sun visor to a side window, or alternatively the reverse side of a double mirror system can be used as a vanity mirror with illumination as required.

24 Claims, 3 Drawing Sheets

OPTICAL SYSTEM FOR VIEWING THE REAR SEAT OF A VEHICLE

BACKGROUND

There is a need to provide an effective system for a driver of an automobile to view the rear seat from the front of an automobile without the need for turning around, and at the same time provide an unobtrusive system for effecting such viewing.

This invention relates to optical systems in automobiles. More particularly, the invention is directed to an optical system for permitting the driver or front seat passenger of a vehicle to observe the position and condition of an infant occupant on the rear seat.

Currently an infant is placed in an infant's safety seat on the rear seat of the vehicle and is strapped into the safety seat with the infant facing rearward. While facing rearward, the infant is not readily visible by occupants of the front seat and the infant's needs and condition are not readily discernible.

Although the driver or passenger in the front seat attempt to use either the rearview mirror or the visor mirror to observe the infant so positioned on the rear seat, such practice is awkward and cumbersome and not really effective.

A need exists for a safety optical system whereby the occupants of the front seat may readily observe an infant occupant in the rear seat while in its safety seat, without jeopardizing the safety of the driver, infant and/or other passengers in the vehicle. The system should include components which may be readily usable in connection with existing optical units within the vehicle.

Existing devices provide an additional removable mirror for use on the rear window. This has disadvantages in impeding vision, and can fall on the infant if this becomes dislodged and possibly cause injury. Also, the rearview window in many cars, trucks, station wagons, and minivans is so distant as to not permit the effective use of such an optical system.

There is a need for an optical system which can be built into the vehicle or provided as an add-on feature to the vehicle.

SUMMARY

The present invention seeks to provide an optical system for observing an infant occupant in its safety seat when buckled to the rear seat of a vehicle which minimizes the disadvantages of existing systems.

According to the invention, there is provided a mirror downwardly depending from the roof structure of the vehicle. The mirror is in alignment with a rearview mirror so that an optical axis is established permitting the driver or passenger in the front seat to observe the infant occupant of the rear seat.

In one form of the invention, the optical system includes an adjustable rearview mirror placed immediately ahead of the occupants in the front seat. There is a mirror which is front facing detachably mounted to the headliner of a vehicle above the rear seat of the vehicle. The forward facing mirror is a visor-type vanity mirror adjustably mounted so that the reflected image of the infant occupant of the rear seat is transmitted to the rearview mirror or visor mirror ahead of the front seat for viewing by the front seat occupants.

In one form of the invention the forward facing mirror includes a base and is hingedly foldable into alignment with the headliner or roof structure of the vehicle when not in use.

The optical system for viewing an infant occupant in the rear seat is adjustable so that persons in the front seat have ready access to viewing the infant without body distortion or unusual head movement.

A relatively inexpensive system is provided using an existing mirror in an auto vehicle in combination with a permanent or removable roof mounted forward facing mirror.

The roof mirror is readily adjustable with respect to a base so as to be a part of an optical alignment system for remotely viewing the rear seat area of a vehicle from the front seat. Also, the relative location of the roof mounted mirror can be changed by locating the mirror on a track for lateral and/or longitudinal movement on the roof.

Another aspect of the invention is to have a multipurpose mirror system wherein the normally hinged forward facing mirror can be in a location adjacent to the side window and acting selectively as a sun visor structure, or be in a location swivelled around to act as a vanity mirror for a passenger in the rear seat, or to act as the forward facing mirror to view the infant.

The invention is further described with reference to the accompanying drawings.

DRAWINGS

DESCRIPTION

Figure 1:
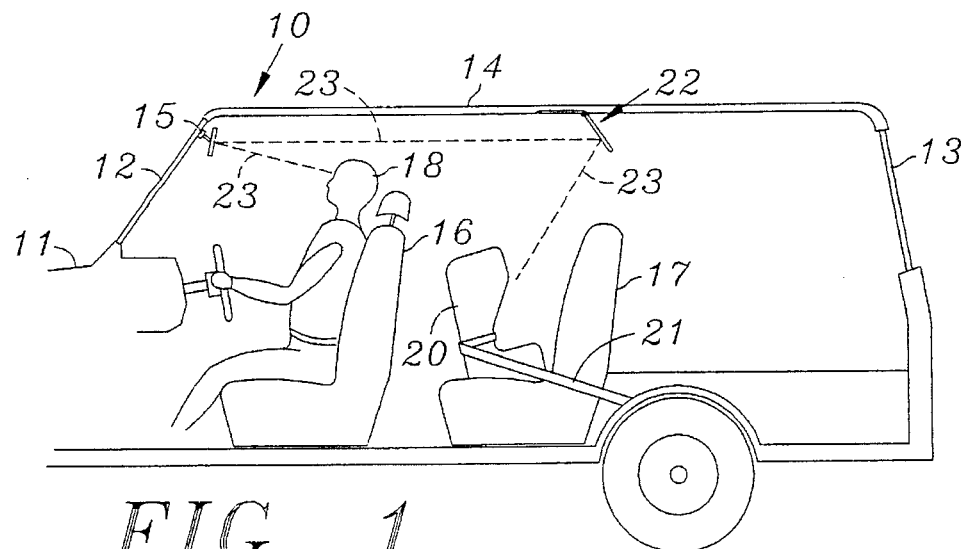
FIG. 1 is a diagrammatic side view of a vehicle incorporating the novel optical system whereby the occupant of the front seat may view an infant occupant in the rear seat.

A vehicle includes a body 11 having a forward windshield 12 and a rear windshield 13 which are connected together by a roof structure 14. A rearview mirror 15 is attached to the inside of the front windshield 12. The interior includes a front seat 16 and a rear seat 17.

The front seat 16 is occupied by a driver 18. An infant car seat 20 is located in a rearward facing position on the rear seat 17. This orientation of a baby or infant seat 20 is conventional and the infant seat is releasably retained on the rear seat 17 by means of a safety belt and buckle arrangement 21. Such a conventional infant seat generally includes a high back against which the infant rests and the infant faces rearwardly with side panels carried on the infant seat back that substantially enclose the infant in its seated position.

The mirrored system uses the rearward facing mirror 15 by placing an auxiliary mirror 22 along an optical axis permitting viewing by the front-seated passengers 18 of the infant in the seat 20. The optical axis is represented by the broken line 23 that extends from the eyes of the observer to the rearward facing mirror 15 and then to the forward facing mirror 22 which reflects the image of the child or infant in the seat 20. The optical axis is unbroken and does not require the front seat occupant to turn his head or to dislodge his body from a normal driving position. In place of the conventional rearview mirror 15, a mirror on the back of a standard visor adjacent to the juncture of the roof structure 14 with the upper edge of the window 12 may be used. Both mirrors are fully articulated so that adjustment to provide the proper optical axis can be obtained. The same kind of articulation or adjustment is available for the forward facing mirror 22 as well.

Figure 3:
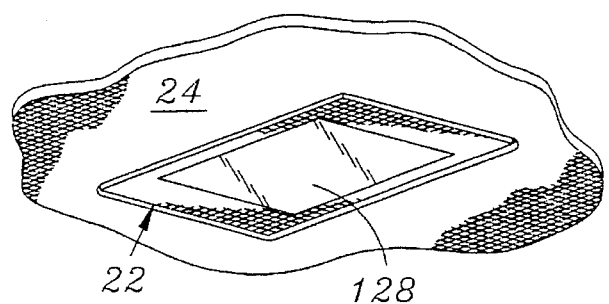
FIG. 3 is a perspective view of the forward facing mirror in closed position with an optional rear facing mirror.

The mirror 22 is affixed to the headliner of the roof structure 24 so that when closed as illustrated in FIG. 3 the mirror 22 adopts a substantially flush position with the headliner 24. The headliner 24 is a fabric-type material which is mounted on a board 25 to provide stability to the fabric 24 of the headliner. An indentation 26 provided in the board provides for accommodating the mirror 22 in the flush position when closed. The mirror 22 includes, at one end, a hinge 27 about which the mirror 22 can close and open as required. The mirror includes a reflective face 28 and two lights 29 and 30 to either side of the reflective face. In this manner, when the mirror 22 is opened so that the optical axis is shown along line 23, the lights 29 and 30 reflect downwardly on an infant located in the seat 20.

Figure 4:
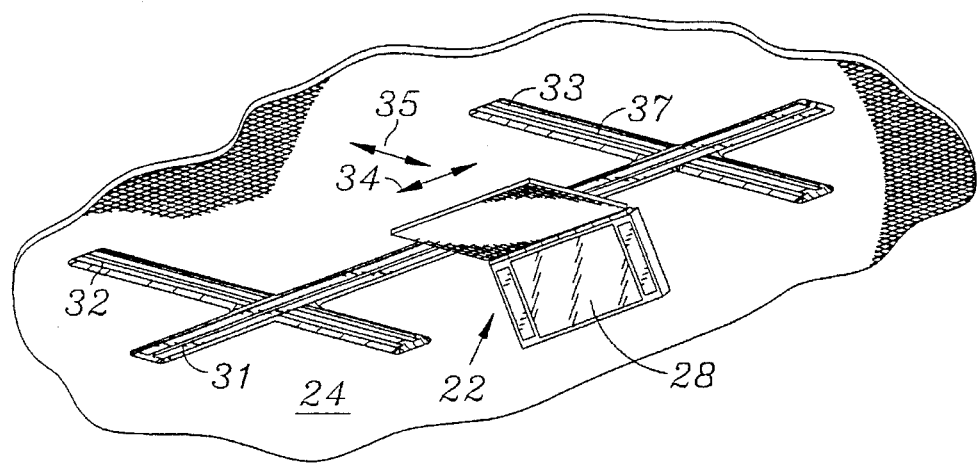
FIG. 4 is a perspective view of one forward facing mirror on a track for lateral and/or longitudinal movement.

As illustrated in FIG. 4, the mirror 22 is mounted with respect to track 31 which permits for parallel longitudinal movement with the direction of the rear seat 17 across the vehicle 10. The mounting is relative to spaced parallel tracks 32 and 33, respectively, which permits the mirror 22 to move transversely from back to front of the vehicle or relative to the rear seat 17. The longitudinal direction is illustrated by arrows 34 and the transverse direction by arrows 35.

Figure 6:
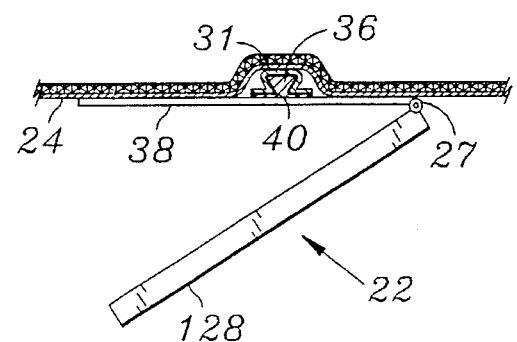
FIG. 6 is a cross-sectional diagrammatic sideview of a hinged forward facing mirror riding on a track for movement on the roof structure.
Figure 5:
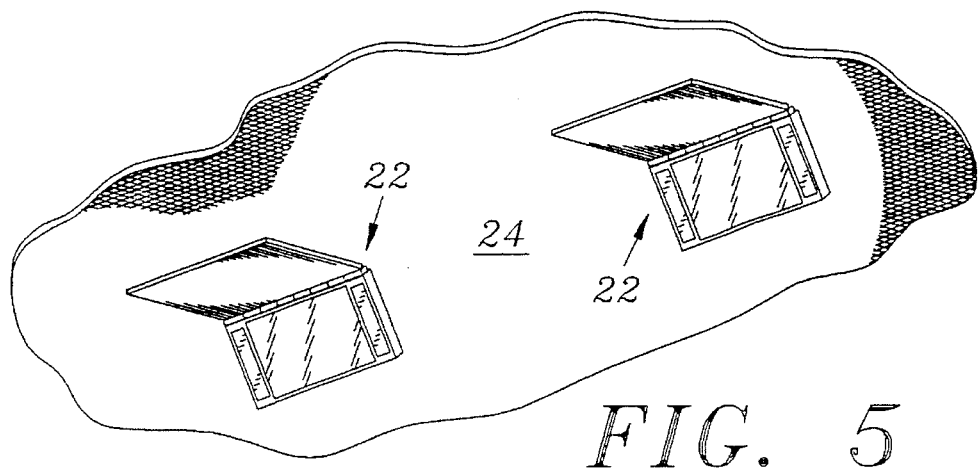
FIG. 5 is a perspective view of one or more forward facing mirrors.

In the illustration of FIG. 6, there can be seen a protrusion 36 which mates with a groove 40 so that the mirror 22 can be moved as required in the tracks 31, 32, and 33. The movement of the track 31 is effected relative to tracks 32 and 33 so that the mirror effectively moves transversely along a line 35, as required.

In other embodiments of the invention, a pair of mirrors 22 are provided for alignment over the rear seat 17 so that the one would be on the left-hand side of the rear seat and the other on the right-hand side of the rear seat. A single mirror may also be used in lieu of the dual mirror arrangement.

Figure 2:
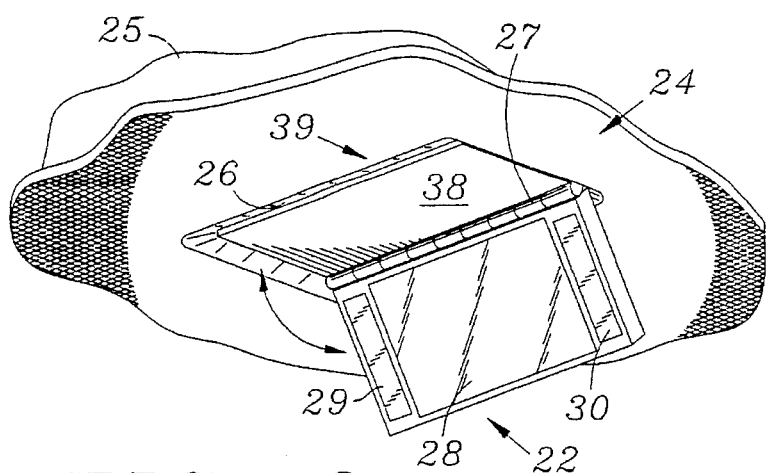
FIG. 2 is a perspective view of the forward facing mirror in open position used in the optical system.

In some forms of the invention, the mirror 22 is built into the headliner on a permanent basis within the indentation 26, as provided. In other forms of the invention, the base 38 is provided as shown in FIG. 2. This base can have a surface 39 for engaging the headliner material 24 in a permanent or removable fashion. This may be a suitable adhesive or a Velcro-type fitting. It is ideally essential that the mirror 22 when placed in a removable manner on the headliner 24 is securely affixed and would not inadvertently drop from the roof liner 24.

The placement of the mirror 22 in the headliner area 24 reduces and/or eliminates impaired visibility which would otherwise occur if the mirror was located on the rear windshield 13. Also, by locating the mirror in the roof structure above the rear seat, there is provided a means for moving the mirror relative to the seat, as the rear seat may be adjusted in location in the vehicle 10. Certain vehicles, such as station wagons, trucks and minivans, provide for the adjustable location of the rear seat and, therefore, there is a need to be able to locate the forward facing mirror 22 in a correct position on the roof above the rear seat 17.

The hinge 27 is a friction-type hinge so that when the mirror 22 is opened relative to the face 39, the mirror will adopt an appropriate position and remain in a fixed location as set by the occupant of the vehicle. The forward facing mirror is in the nature of a vanity mirror which is typically provided on a visor in the front of a vehicle. The mounting provided for such forward facing mirror on the headliner 24 is similar to that provided for the visor mounted vanity mirrors.

The mirrored optical system provides a means for observing the position and condition of an infant occupant in a rear facing infant seat such as seat 20 while strapped in a vehicle. The occupants of the front seat need not turn their heads rearwardly nor reposition themselves from a normal riding position on the front seat in the vehicle. Their eyes merely have to glance at either the rearview mirror 15 or a visor mirror along the front roof line in order to view the image of the infant via the reflective surface 28 of the forward facing mirror 22.

Figure 8:
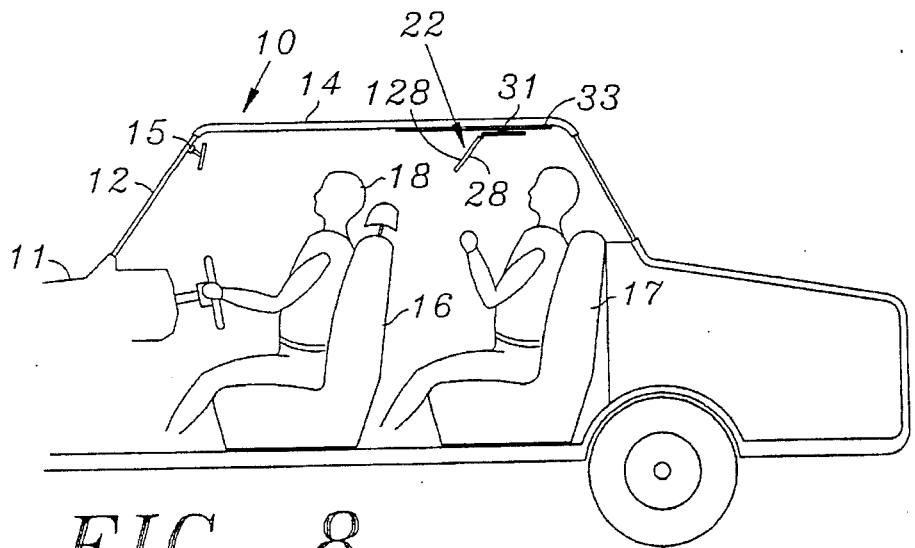
FIG. 8 is a sideview of a vehicle showing the normally hinged forward facing mirror in a location swivelled around to act as a vanity mirror for a passenger in the rear seat.

The forward facing mirror 22 could be a double sided mirror, namely having a reflected face 128 on the rear side and the front side and can also swivel relatively in the groove 40 through the protrusion 36. In this manner, and as illustrated in FIG. 8, the forward facing mirror 22 can be used not only for creating an optical axis 23 to cooperate with the rearward facing mirror 15 for viewing the contents of the rear seat, but also as a vanity mirror per se. Thus, the forward facing mirror 22 can be turned to face rearwardly so that a passenger sitting in the rear seat can use this for vanity mirror purposes. In other situations, the forward facing mirror 22 can be angled relatively to any appropriate position in the groove 40. In different situations the reflective face 28 or the reflective face 128 could be used to serve the vanity mirror purpose depending on whether the swivel feature is used or not.

Figure 7:
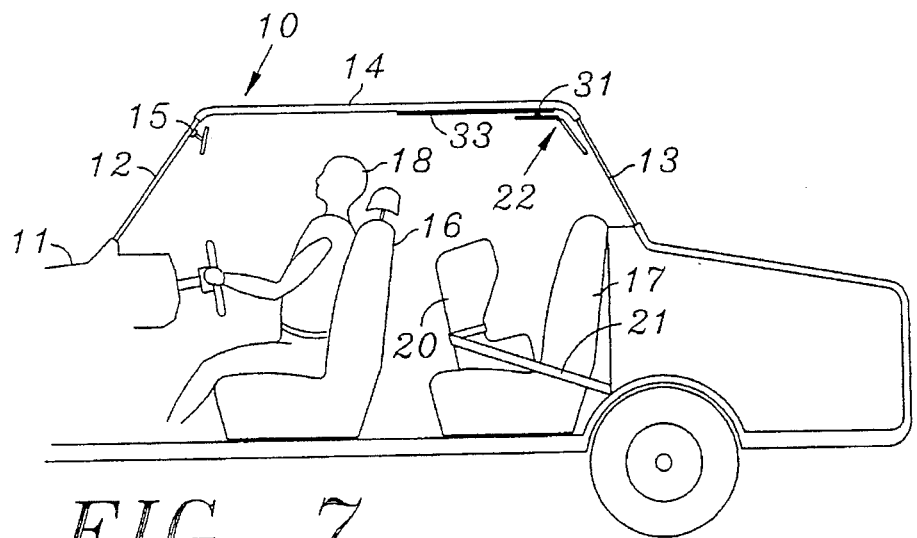
FIG. 7 is a sideview of a vehicle showing the normally hinged forward facing mirror in a location adjacent to the rear window and acting as a sun visor structure.

In another situation, for instance as illustrated FIG. 7 the normally hinged forward facing mirror can ride in a track to be located adjacent to the rear window and act as a sun visor structure for the rear of the vehicle.

Figure 9:
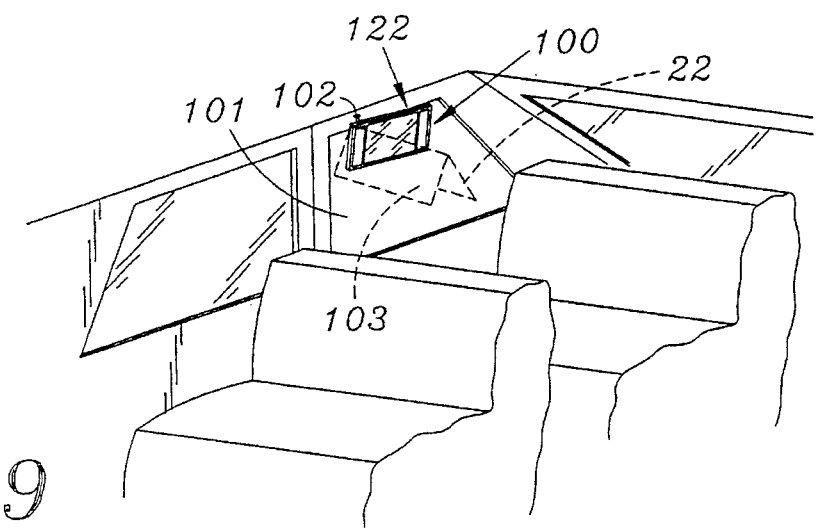
FIG. 9 is a view of a vehicle showing the normally hinged forward facing mirror in a location adjacent to the side window and acting selectively as a sun visor structure, in a location swivelled around to act as a vanity mirror for a passenger in the rear seat, or as a forward facing mirror.

FIG. 9 illustrates a multipurpose mirror system 122 with reflective surfaces on opposite sides. The normally hinged forward facing mirror 22 can be in a location 100 adjacent to the side window 101 and act as a sun visor structure to shield the interior of the vehicle from the exterior. Alternatively, the mirror system can be in a location swivelled around on stud 102 to act as a vanity mirror 103 for a passenger in the rear seat 17. In a further alternative the system can act as a forward facing mirror 22.

While different embodiments of the invention have been shown and described, changes and modifications may be made without departing from the scope of the invention. The invention should be determined in terms of the following claims.

What is claimed is:

1. An optical system in a vehicle having a front and rear seat and a front window and rear window joined at their upper edges by a roof structure so as to define a compartment for passengers, comprising:

a rear facing mirror carried on the front window;

a forward facing mirror mounted on a headliner mounted below the roof structure so as to be located between the front window and rear window at a location removed from the rear window;

an optical axis established from the front seat to the rear seat via the rear facing mirror and the forward facing mirror; and the forward facing mirror having adjustment means for movably aligning the mirror with respect to the rear facing mirror for viewing a selected area of the rear seat, and wherein the forward facing mirror includes means to selectively permit a relatively substantially flush position of the forward facing mirror with the headliner of the roof of the vehicle.

2. A system as claimed in claim 1, including lighting means for effectively illuminating the rear seat when the forward facing mirror is directed to direct the optical axis to the rear seat.

3. A system as claimed in claim 2, wherein the forward facing mirror is mounted to be movable transversely relative to the rear seat.

4. A system as claimed in claim 1, wherein the forward facing mirror is mounted to be movable transversely relative to the back seat or substantially longitudinally relative to the rear seat.

5. A system as claimed in claim 4, wherein the forward facing mirror is mounted to be movable transversely relative to the rear seat.

6. A system as claimed in claim 1, including a second forward-facing mirror, the second forward-facing mirror being longitudinally spaced from the first forward facing mirror, the longitudinal spacing being determined by the location of the rear seat.

7. An optical system in a vehicle having a front and rear seat and a front window and rear window joined at their upper edges by a roof structure so as to define a compartment for passengers, comprising:

a rear facing mirror carried on the front window;

a forward facing mirror carried on the roof structure;

an optical axis established from the front seat to the rear seat via the rear facing mirror and the forward facing mirror; and the forward facing mirror having adjustment means for movably aligning the mirror with respect to the rear facing mirror for viewing a selected area of the rear seat wherein the adjustment means includes a hinge for adjustably coupling one end of the mirror to the roof.

8. A system as claimed in claim 7, wherein the forward facing mirror is mounted to be movable transversely relative to the rear seat.

9. A system as claimed in claim 7, including lighting means located adjacent to the mirror.

10. An optical system in a vehicle having a front and rear seat and a front window and rear window joined at their upper edges by a roof structure so as to define a compartment for passengers, comprising:

a rear facing mirror carried on the front window;

a forward facing mirror carried on a headliner of the roof structure;

an optical axis established from the front seat to said rear seat via said rear facing mirror and the forward-facing mirror; and the forward facing mirror having adjustment means for movably aligning the forward facing mirror with respect to the rear facing mirror for viewing a selected area of the rear seat, the adjustment means including a hinge coupling the forward facing mirror to the headliner and wherein the forward-facing mirror adopts a relatively flush position with the roof headliner of the vehicle when not in use.

11. A system as claimed in claim 10, including lighting means for effectively illuminating the back seat when the forward facing mirror is directed to direct the optical axis to the back seat.

12. A system as claimed in claim 11, wherein the lighting means is located adjacent to the mirror.

13. A system as claimed in claim 10, wherein the forward facing mirror is mounted to be movable transversely relative to the rear seat or substantially longitudinally relative to the rear seat.

14. A system as claimed in claim 10, wherein the forward facing mirror is mounted to be movable transversely relative to the back seat.

15. A system as claimed in claim 10, including a second forward-facing mirror, the second forward-facing mirror being longitudinally spaced from the first forward facing mirror, the longitudinal spacing being determined by the location of the rear seat.

16. A system as claimed in claim 10, wherein the forward-facing mirror is removably connected with the roof headliner.

17. A system as claimed in claim 10, wherein the forward-facing mirror includes opposite reflective surfaces, the one surface being usable to create the optical axis with the rear facing mirror, and the opposite surface being available for using the mirror to create a reflective surface for a passenger in the rear seat.

18. A system as claimed in claim 10, including means for permitting the forward-facing mirror to swivel whereby a reflective surface is selectively for use to create a reflective surface for a passenger in the rear seat.

19. A system as claimed in claim 10, including means for permitting the forward-facing mirror to move towards the rear window selectively for use as a visor in relation to the rear window.

20. A mirror system in a vehicle having a front and rear seat and a front window and rear window joined at their upper edges by a roof structure so as to define a compartment for passengers and there also being a side window, comprising:

a rear facing mirror carried on the front window;

a forward facing mirror selectively rotatable in different positions, one of which is a forward facing position such that an optical axis is established from the front seat to the rear seat via the rear facing window and the forward facing mirror; a different position being for location adjacent to a side window of a vehicle thereby to shield sunlight from entering the compartment of the vehicle from the exterior of the vehicle through said side window; and the forward facing mirror having adjustment means for movably aligning the forward facing mirror with respect to the rear facing mirror for viewing a selected area of the rear seat.

21. A system as claimed in claim 20, wherein the forward-facing mirror includes opposite reflective surfaces, the one surface being usable to create the optical axis with the rear facing mirror, and the opposite surface being available for using the mirror to create a reflective surface for a passenger in the rear seat.

22. A system as claimed in claim 21, including lighting means for effectively illuminating the rear seat when the forward facing mirror is directed to direct the optical axis to the rear seat, and selectively including lighting means operable with the second reflective face to facilitate use by a passenger in the rear seat.

23. A system as claimed in claim 22, wherein the lighting means is located adjacent to the mirror.

24. A system as claimed in claim 20, wherein the adjustment means includes a friction hinge coupling one end of the mirror to the roof.

* * * * *